(12) United States Patent
Kaneko

(10) Patent No.: US 12,059,760 B2
(45) Date of Patent: Aug. 13, 2024

(54) SNAP-FIT STRUCTURE AND METHOD OF ASSEMBLING SNAP-FIT STRUCTURE

(71) Applicant: CANON KABUSHIKI KAISHA, Tokyo (JP)

(72) Inventor: Toshiaki Kaneko, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 17/976,686

(22) Filed: Oct. 28, 2022

(65) Prior Publication Data

US 2023/0150073 A1 May 18, 2023

(30) Foreign Application Priority Data

Nov. 12, 2021 (JP) .................................. 2021-184766

(51) Int. Cl.
*B23P 19/02* (2006.01)
*F16B 2/20* (2006.01)

(52) U.S. Cl.
CPC ................ *B23P 19/02* (2013.01); *F16B 2/20* (2013.01)

(58) Field of Classification Search
CPC .... B41J 2/17553; B41J 2/17559; B23P 19/02; F16B 2/20
See application file for complete search history.

(56) References Cited

U.S. PATENT DOCUMENTS

| | | | | | |
|---|---|---|---|---|---|
| 4,708,895 | A | * | 11/1987 | Mizusawa | F16B 21/088 24/581.1 |
| 5,851,097 | A | * | 12/1998 | Shereyk | F16L 3/223 411/508 |
| 2006/0125286 | A1 | * | 6/2006 | Horimatsu | F16B 5/0642 296/187.03 |
| 2012/0321379 | A1 | * | 12/2012 | Wang | F16B 5/0642 403/321 |
| 2015/0010345 | A1 | * | 1/2015 | Takita | F16B 5/0642 403/345 |
| 2015/0059133 | A1 | * | 3/2015 | Hirakawa | F16B 21/086 24/458 |
| 2015/0059148 | A1 | * | 3/2015 | Ohira | B41J 2/17553 29/428 |
| 2015/0322985 | A1 | * | 11/2015 | Scroggie | F16B 21/086 24/458 |
| 2018/0194299 | A1 | * | 7/2018 | Del Pozo Gonzalez | F16B 5/0664 |
| 2019/0315290 | A1 | * | 10/2019 | Shinohara | F16B 21/086 |
| 2019/0385767 | A1 | * | 12/2019 | Takahashi | H01R 9/16 |
| 2020/0288582 | A1 | * | 9/2020 | Maurech | H05K 5/0221 |

FOREIGN PATENT DOCUMENTS

JP 2004-332762 11/2004

* cited by examiner

*Primary Examiner* — Daniel J Wiley
(74) *Attorney, Agent, or Firm* — Venable LLP

(57) ABSTRACT

An object is to provide a snap-fit structure in which space on a side where an engaging portion elastically deforms can be effectively utilized. The snap-fit structure includes a mounting component with a first engaging portion and a second engaging portion and a mounted component formed with an engaged portion for engaging the first engaging portion and the second engaging portion. The second engaging portion is arranged in a position not aligned on the same line in a direction in which the first engaging portion elastically deforms.

8 Claims, 17 Drawing Sheets

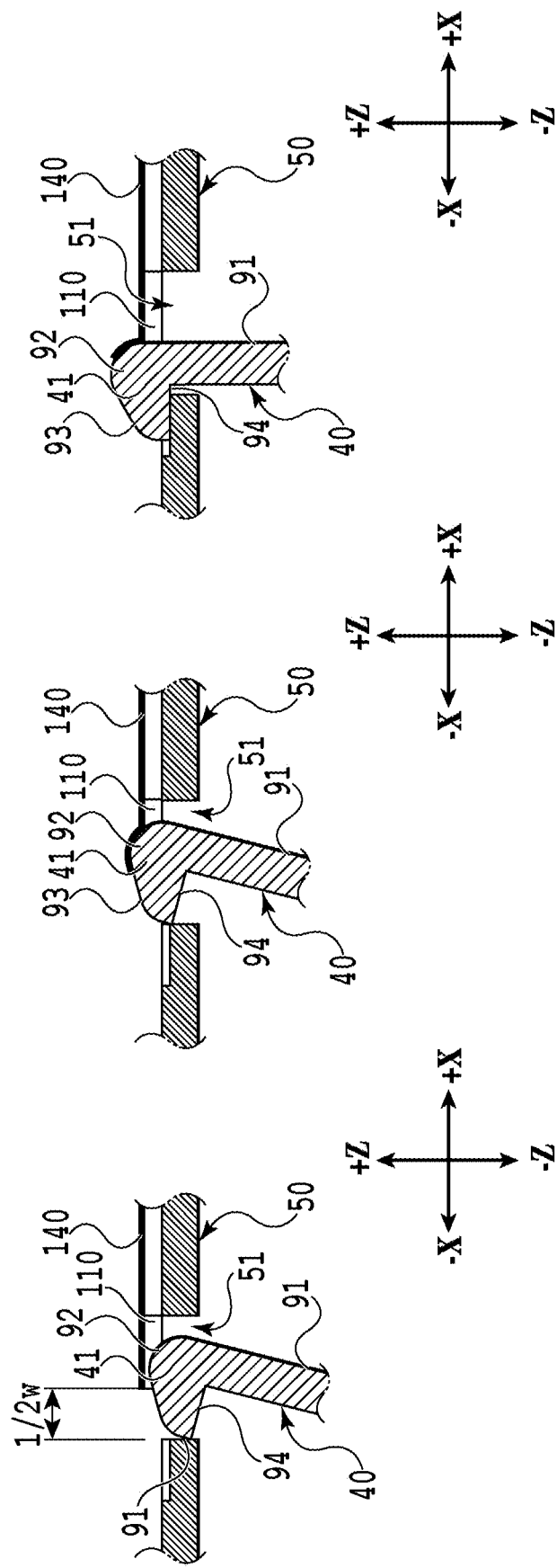

SNAP-FIT STRUCTURE AND METHOD OF ASSEMBLING SNAP-FIT STRUCTURE

BACKGROUND

Field of the Invention

The present disclosure relates to a snap-fit structure and a method of assembling the snap-fit structure.

Description of the Related Art

Japanese Patent Laid-Open No. 2004-332762 discloses a technique of providing a dimension-maintaining member for maintaining a dimension between opposing snap-fit portions (engaging portions) in a mounting hole.

However, in the technique disclosed in Japanese Patent Laid-Open No. 2004-332762, since the dimension-maintaining member is arranged on a side where an engaging portion elastically deforms, space on the side where the engaging portion elastically deforms cannot be effectively utilized.

An object of the present disclosure is to provide a snap-fit structure in which the space on the side where the engaging portion elastically deforms can be effectively utilized.

SUMMARY

In order to achieve the object, a snap-fit structure of the present disclosure comprises a mounting component with a first engaging portion and a second engaging portion and a mounted component formed with an engaged portion for engaging the first engaging portion and the second engaging portion, wherein the second engaging portion is arranged in a position not aligned on the same line in a direction in which the first engaging portion elastically deforms.

Further features of the present disclosure will become apparent from the following description of exemplary embodiments with reference to the attached drawings.

BRIEF DESCRIPTION OF THE DRAWINGS

FIGS. 15A, 15B, and 15C are schematic diagrams showing a method of assembling the snap-fit structure according to the present embodiment;

DESCRIPTION OF THE EMBODIMENTS

A common snap-fit structure will be described below to facilitate understanding of a snap-fit structure of the present disclosure.

Figure 1:
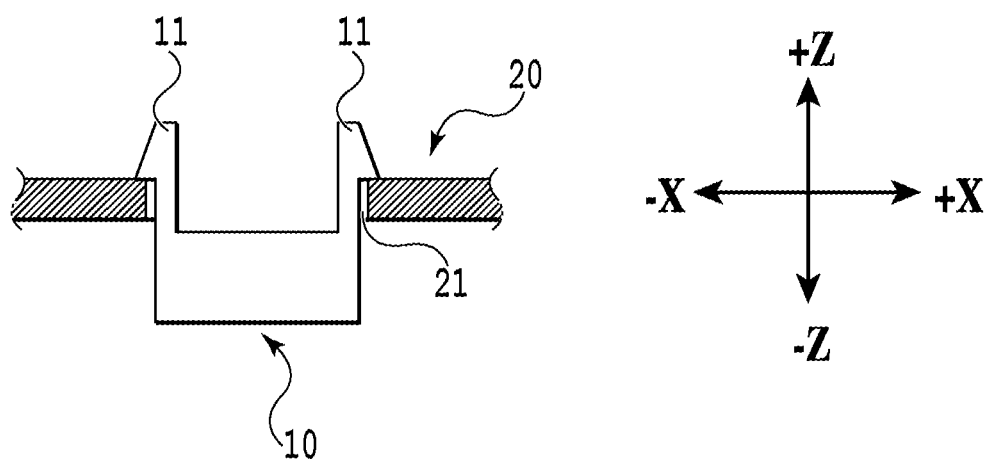
FIG. 1 is a schematic diagram of a common snap-fit structure.

FIG. 1 is a schematic diagram of a common snap-fit structure. The common snap-fit structure includes a mounting member 10 and a mounted member 20 on which the mounting member 10 is mounted. The mounting member 10 includes an engaging portion 11 having elasticity. The mounted member 20 includes a hole portion 21. In a case where the mounting member 10 is mounted on the mounted member 20, the engaging portion 11 is pressed into the hole portion 21 while being elastically deformed and reduced in diameter. Then, after the engaging portion 11 passes through the hole portion 21, the engaging portion 11 returns to an original shape due to an elastic restoring force. As a result, the engaging portion 11 can be engaged with the hole portion 21. That is, the snap-fit structure makes it possible to easily mount the mounting member 10 on the mounted member 20 only by pressing the engaging portion 11 into the hole portion 21.

Figure 2:
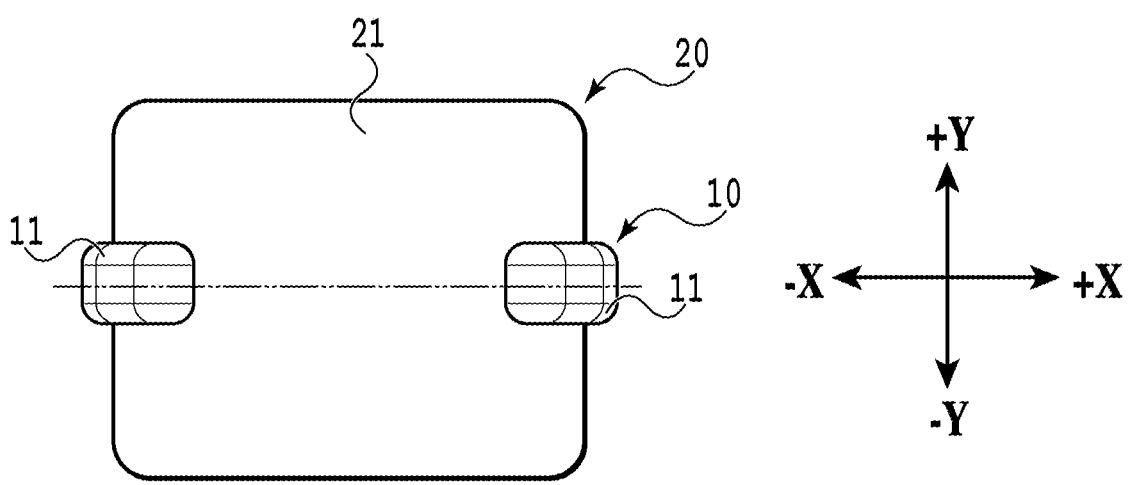
FIG. 2 is a schematic diagram of the common snap-fit structure viewed from above.

FIG. 2 is a schematic diagram of the common snap-fit structure viewed from above. Above means a +Z direction shown in FIG. 1. As shown by a two-dot chain line in FIG. 2, the two engaging portions 11 are arranged so that surfaces on a side in a direction of elastic deformation are aligned on the same line inside the hole portion 21. That is, inside the hole portion 21, the two engaging portions 11 are back to back on the same line in the direction of elastic deformation (X-axis direction). Hereinafter, a plane on the side in the direction in which the engaging portion 11 elastically deforms will be referred to as a "back side" as appropriate. The two engaging portions 11 being aligned so that their back sides face each other is appropriately referred to as "back to back."

Figure 3B:
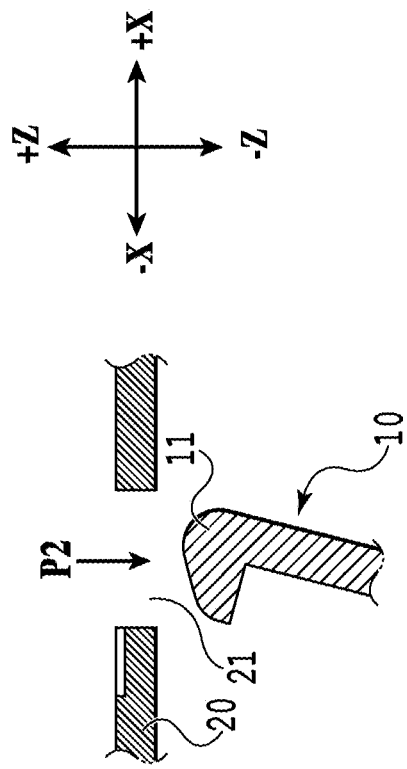
FIGS. 3A and 3B are schematic diagrams showing how disengagement occurs in the common snap-fit structure.
Figure 3A:
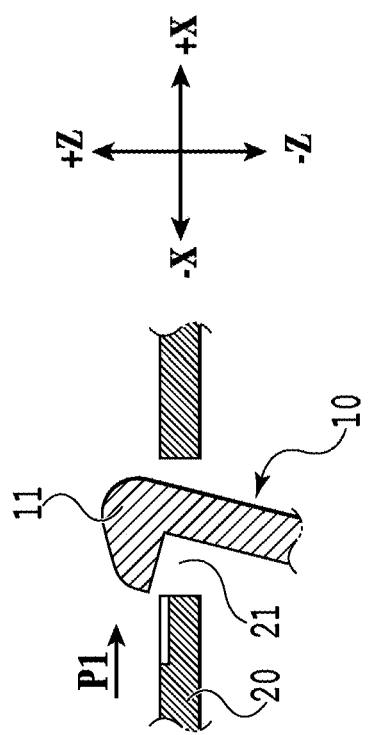

FIGS. 3A and 3B are schematic diagrams showing how the common snap-fit structure is disengaged. As shown in FIG. 3A, it is assumed that after the mounting member 10 is mounted on the mounted member 20, a force is applied in a direction in which the engaging portion 11 is elastically deformed (an arrow P1 direction). This causes the engaging portion 11 to be elastically deformed and reduced in diameter. As shown in FIG. 3B, in a case where the engaging portion 11 is reduced in diameter, the engaging portion 11 cannot engage the mounted member 20. Then, a force is applied in a gravity direction (an arrow P2 direction) and the mounting member 10 is disengaged from the mounted member 20. Up to this point the common snap-fit structure has been described.

First Embodiment

Figure 4:
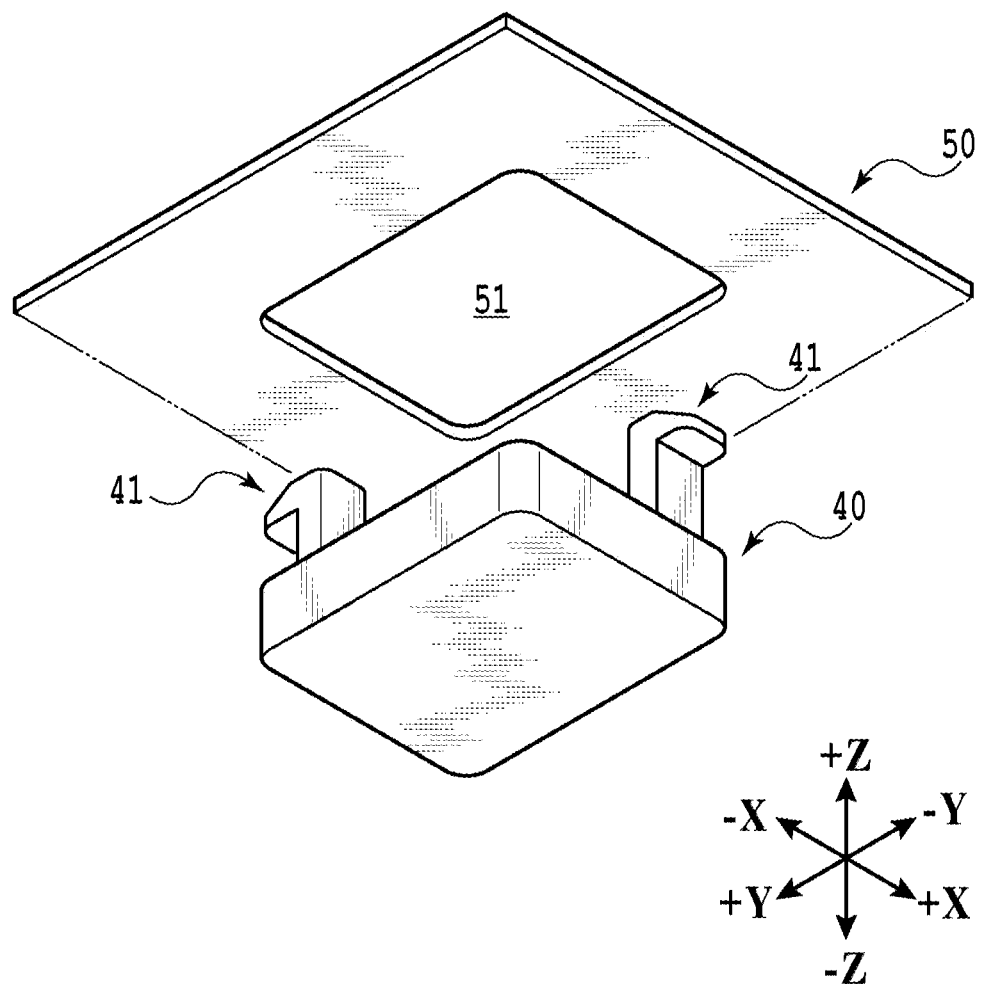
FIG. 4 is a schematic diagram of a snap-fit structure according to the present embodiment.

FIG. 4 is a schematic diagram of a snap-fit structure according to the present embodiment. As shown in FIG. 4, the snap-fit structure according to the present embodiment includes a first mounting component 40 and a first mounted component 50. The first mounting component 40 includes a snap-fit portion 41 as an engaging portion that engages the first mounted component 50. On the other hand, the first mounted component 50 includes an opening 51 as an engaged portion engaged by the snap-fit portion 41. In the present embodiment, the snap-fit portion 41 engages an opening 51 formed in the first mounted component 50. As a result, the first mounting component 40 can be mounted on the first mounted component 50.

Figure 5:
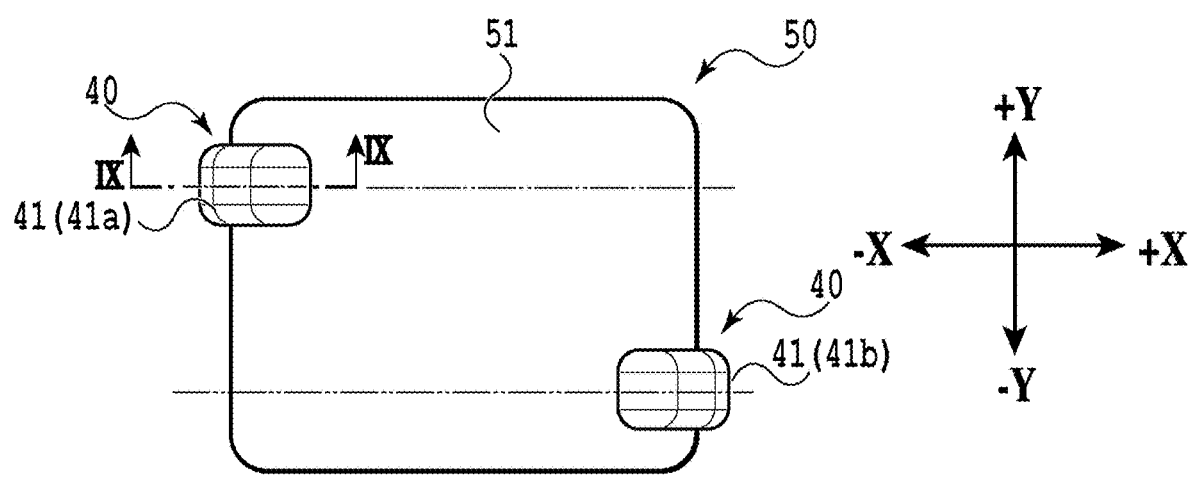
FIG. 5 is a schematic diagram of the snap-fit structure according to the present embodiment as viewed from above.

FIG. 5 is a schematic view of the snap-fit structure according to the present embodiment as viewed from above. As shown in FIG. 5, the snap-fit portion 41 includes an elastically deformable first engaging portion 41a and an elastically deformable second engaging portion 41b. The first engaging portion 41a and the second engaging portion 41b are arranged so as not to be aligned with each other on the same line in the direction of elastic deformation (X-axis direction). That is, the first engaging portion 41a and the second engaging portion 41b are arranged so as not to be back to back.

The configuration enables space on the back side of the first engaging portion 41a or space on the back side of the second engaging portion 41b to be larger than in a case where the first engaging portion 41a and the second engaging portion 41b are arranged back to back. That is, this configuration makes it possible to effectively utilize at least one of the space on the back side of the first engaging portion 41a and the space on the back side of the second engaging portion 41b. For example, the second engaging portion 41b is not arranged on the back side of the first engaging portion 41a. Thus, another component (not shown) can be arranged on the back side of the first engaging portion 41a. Accordingly, the snap-fit structure according to the present embodiment makes it possible to effectively utilize the space on the side where the snap-fit portion 41 elastically deforms.

Second Embodiment

Figure 6:
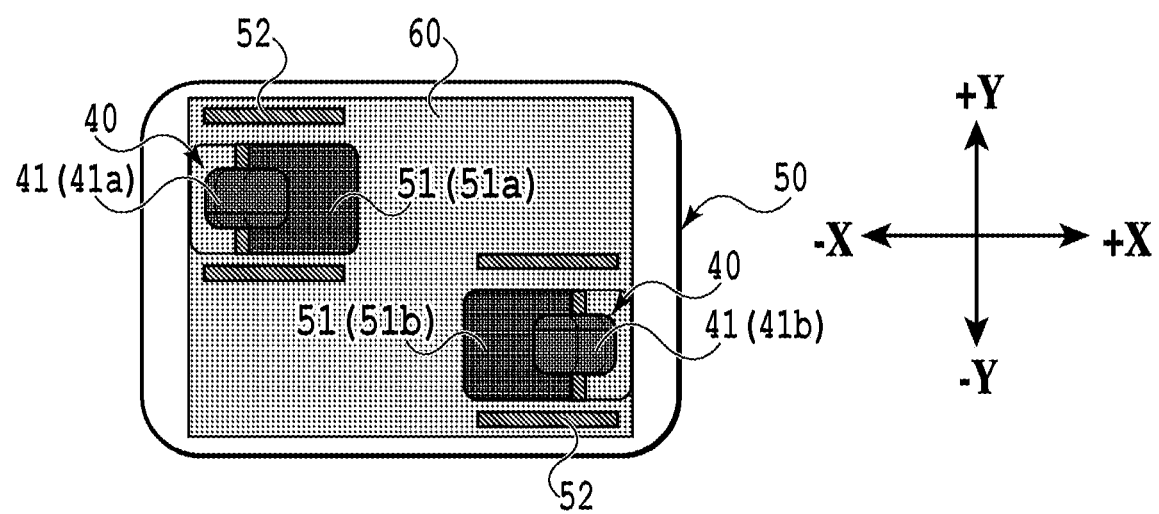
FIG. 6 is a schematic diagram of the snap-fit structure according to the present embodiment as viewed from above.

FIG. 6 is a schematic view of the snap-fit structure according to the present embodiment as viewed from above. An object of the present embodiment is to provide a snap-fit structure in which disengagement is less likely to occur. The snap-fit structure according to the present embodiment is different from the snap-fit structure according to the first embodiment in the arrangement of the opening 51 and in that the snap-fit structure according to the present embodiment includes a film 60. In the following description, the same reference numeral will be given to the same or corresponding constituent as in the first embodiment, the description thereof will be omitted, and a difference will be mainly described.

Entire Configuration

As shown in FIG. 6, the opening 51 according to the present embodiment includes a first opening 51a for engaging the first engaging portion 41a and a second opening 51b for engaging the second engaging portion 41b. That is, the first engaging portion 41a engages the first opening 51a. On the other hand, the second engaging portion 41b engages the second opening 51b. The first mounted component 50 according to the present embodiment includes a first column portion 52 as a base to which the film 60 is adhered (thermal-sealed, for example). The first column portion 52 protrudes toward an insertion direction (to be described later) of the snap-fit portion 41. Further, the first mounted component 50 according to the present embodiment includes the film 60 as a suppressing portion that suppresses elastic deformation of the snap-fit portion 41.

First Mounted Component 50

Figure 7:
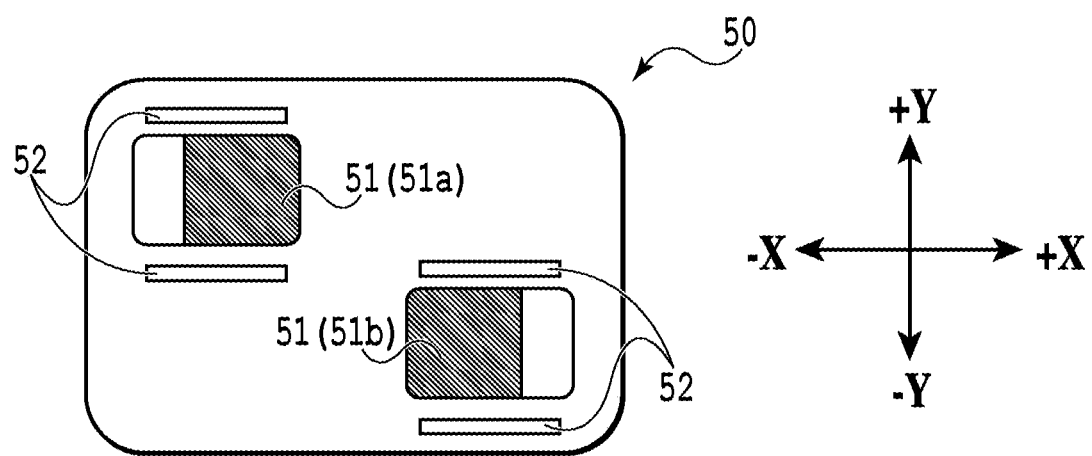
FIG. 7 is a schematic diagram of a first mounted component viewed from above.

FIG. 7 is a schematic diagram of the first mounted component 50 viewed from above. For convenience of description, FIG. 7 does not illustrate the film 60. A material for the first mounted component 50 is not limited as long as the first mounted component 40 can be mounted. For example, resin, metal, ceramic, or a combination thereof can be used as a material for the first mounted component 50. In the present embodiment, polypropylene is used as a material for the first mounted component 50 and the first column portion 52. This is to strengthen adhesion between the first column portion 52 and the film 60. Incidentally, adhesion of the film 60 will be described later.

Opening 51

The first opening 51a and the second opening 51b are formed in positions where the first opening 51a and the second opening 51b are not arranged on the same line in the direction (X-axis direction) in which the snap-fit portion 41 elastically deforms, that is, in different positions on a Y-axis. For example, the second opening 51b is not arranged on the same line in a direction in which the first engaging portion 41a elastically deforms.

First Column Portion 52

The first mounted component 50 according to the present embodiment includes a first column portion 52 on an upper surface (+Z direction side surface). The first column portion 52 extends from the first mounted component 50 in the insertion direction (in a Z-axis direction) of the snap-fit portion 41 by about 0.5 mm to about 1.0 mm. That is, the height of the first column portion 52 is about 0.5 mm to about 1.0 mm. The first column portion 52 is arranged in a position where the elastic deformation of the snap-fit portion 41 is not inhibited. For example, the two first column portions 52 are formed in positions sandwiching the first opening 51a along the direction in which the first engaging portion 41a elastically deforms.

It should be noted that the film 60 can be thermally welded directly to the first mounted component 50 without the first column portion 52. However, it is preferable to bond the film 60 via the first column portion 52. For example, it is assumed that the film 60 is welded directly to the first mounted component 50 without the first column portion 52 interposed therebetween. In this case, it is assumed that the first mounted component 50 is warped. This is because in this case, the distortion of the first mounted component 50 cannot be released and there is possibility that the film 60 may be peeled off from the first mounted component 50.

Further, in a case where the molding accuracy of the upper surface of the first mounted component 50 is low, the upper surface of the first mounted component 50 has more concavities and convexities than the upper surface of the first mounted component 50 having good molding accuracy. Thus, in a case where the film 60 is thermally welded to the first mounted component 50, there is a possibility that air accumulating in a concave portion may thermally expand. In a case where the air accumulating in the concave portion thermally expands, the film 60 is peeled off from the first mounted component 50.

On the other hand, in a case where the first column portion 52 and the film 60 are thermal-welded, the thermal expansion described above can be suppressed at least in a case where the top surface of the first column portion 52 is smooth. That is, intentionally providing the first column portion 52 makes it possible to lessen a region requiring high molding accuracy. Thus, providing the first column portion 52 makes it easier to mold the first mounted component 50.

Film 60

Figure 8:
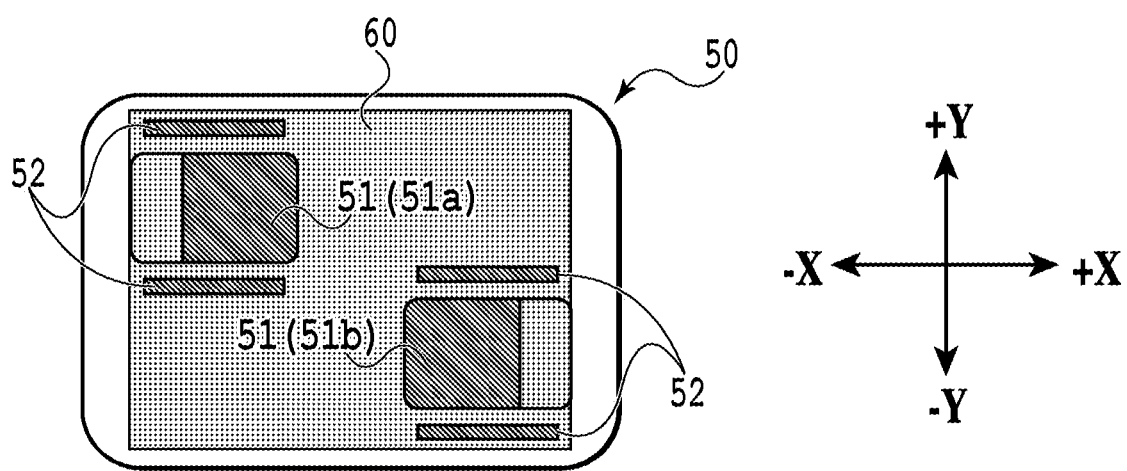
FIG. 8 is a schematic diagram of the first mounted component viewed from above.

FIG. 8 is a schematic diagram of the first mounted component 50 viewed from above. It should be noted that FIG. 8 illustrates the film 60. A material for the film 60 is not limited as long as the member can suppress the elastic deformation of the snap-fit portion 41 by using flexibility. For example, a resin film can be used as a material for the film 60. Specifically, the film 60 may be formed of two upper and lower film layers, the upper layer being a PET film layer, the lower layer being a CPP layer.

In the present embodiment, the film 60 has the function of holding the snap-fit portion 41 from above. In the present embodiment, in a case where the first mounting component 40 is mounted on the first mounted component 50, a leading end 92 (to be described later) of the snap-fit portion 41 contacts the film 60. As a result, the elastic deformation of the snap-fit portion 41 is suppressed and the snap-fit portion 41 is less likely to be reduced in diameter. That is, the film 60 holds the snap-fit portion 41 from above, so that the first mounting component 40 is less likely to be disengaged from the first mounted component 50. Accordingly, considering strength at the time of holding the snap-fit portion 41 with the film 60, the film 60 preferably includes a resin film (e.g., a PET film layer) having strength.

The film 60 also preferably includes a CPP layer underneath the PET film. As described above, a material for the first column portion 52 is polypropylene. Thus, the CPP layer included in the film 60 becomes a compatible layer during thermal welding. As a result, the film 60 and the first column portion 52 can be adhered more tightly. Further, using a resin film as a material for the film 60 facilitates the process of cutting the film 60 (described later).

Even in a case where a rigid component (e.g., a block or the like) is used instead of the film 60 as an elastic-deformation-suppressing member arranged on the back side of the snap-fit portion 41, a disengagement-suppressing effect can be obtained. However, there is also a case where it is necessary to arrange a different component on the back side of the snap-fit portion 41. In a case where the film 60 is used to hold the snap-fit portion 41 from above, there is no need to install the rigid component as an elastic-deformation-suppressing member on the back side of the snap-fit portion 41. Thus, a different component can be arranged on the back side of the snap-fit portion 41.

No matter what kind of shape the leading end 92 of the snap-fit portion 41 has, the snap-fit portion 41 can be held so as to be wrapped by using the film 60 having flexibility. The snap-fit portion 41 can also be held so as to be wrapped by using the film 60 with flexibility no matter what portion of the snap-fit portion 41 the film 60 contacts.

Snap-Fit Portion 41

Figure 9:
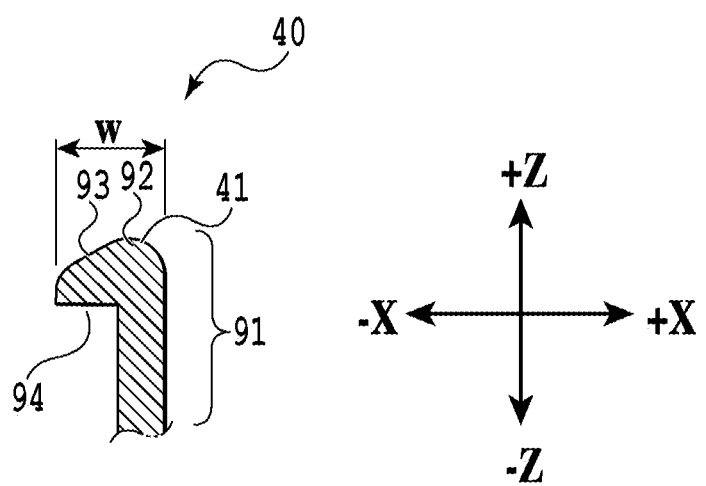
FIG. 9 is a schematic cross-sectional view taken along line IX-IX shown in FIG. 5.

FIG. 9 is a schematic cross-sectional view taken along line IX-IX shown in FIG. 5. As shown in FIG. 9, the first engaging portion 41a includes a back side portion 91, which is a surface on a side in a direction of elastic deformation and diameter reduction, and the leading end 92 that extends from the back side portion 91 and is located most distally in the insertion direction of the snap-fit portion 41 (in a Z-axis direction). The first engaging portion 41a also includes a slope portion 93 extending from the leading end 92 in the direction in which the first engaging portion 41a engages the first mounted component 50 and downward (that is, the −X direction and −Z direction in the drawing). Further, the first engaging portion 41a includes an engaging surface 94 extending from the lower end of the slope portion 93 in the direction of elastic deformation and diameter reduction. In a case where the first engaging portion 41a engages the first opening 51a, the engaging surface 94 comes into contact with and runs on an end of the first opening 51a. This stabilizes the engagement of the first opening 51a.

In this embodiment, the snap-fit portion 41 has a shape such that the width gradually becomes greater downward from the leading end 92 in order to facilitate insertion into the opening 51. The width from the back side portion 91 to the lower end of the slope portion 93 is represented as a width W. The width (the length in the X direction in the drawing) of the lower end of the snap-fit portion 41 is smaller than the width W. This facilitates the elastic deformation of the snap-fit portion 41.

The first engaging portion 41a also has the back side portion 91. As described above, the back side portions 91 of the two snap-fit portions 41 are arranged so as not to be aligned opposite to each other on the same line. A material for the first mounting component 40 is not limited as long as the component can be mounted on the mounted component 50. For example, resin, metal, or a combination thereof is preferably used as a material for the first mounting component 40 in order to facilitate the elastic deformation of the snap-fit portion 41. In the present embodiment, polypropylene is used for molding at low cost.

Method of Assembling the Snap-Fit Structure

Figure 10C:
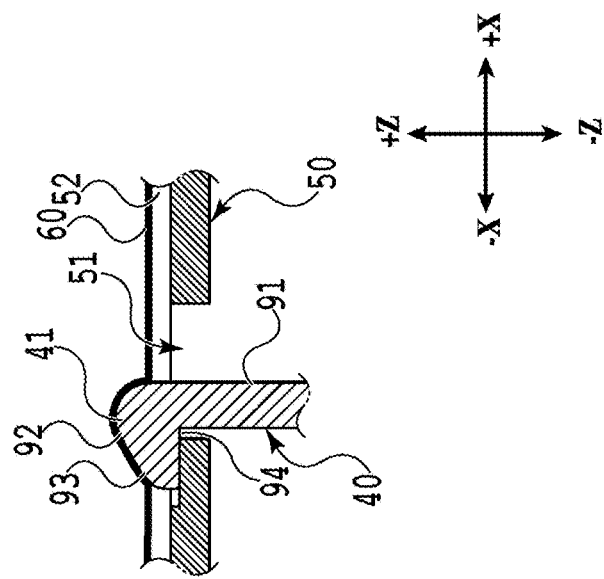
FIGS. 10A, 10B, and 10C are schematic diagrams showing a method of assembling the snap-fit structure according to the present embodiment.
Figure 10B:
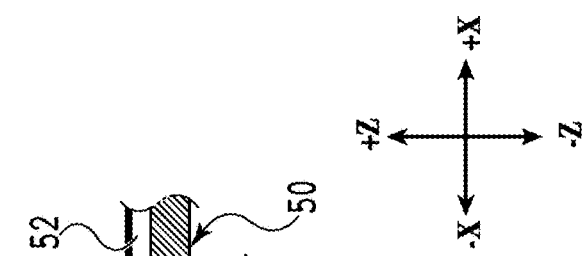
Figure 10A:
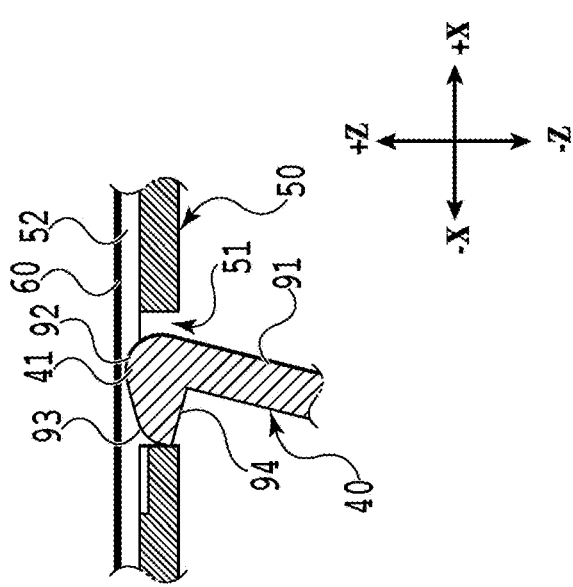

FIGS. 10A, 10B, and 10C are schematic diagrams showing a method of assembling the snap-fit structure according to the present embodiment. The method of assembling the snap-fit structure according to the present embodiment includes the following steps.

First, in the case of mounting the first mounting component 40 on the first mounted component 50, a user presses the first mounting component 40 in a mounting direction (insertion direction) into the first mounted component 50 while keeping the slope portion 93 into contact with the lower end of the opening 51. Then, as the insertion proceeds, the snap-fit portion 41 is elastically deformed and reduced in diameter while being rubbed against the lower end of the opening 51 (FIG. 10A).

Next, the user further presses the first mounting component 40 in the mounting direction into the first mounted component 50 while keeping the lower end of the slope portion 93 into contact with an inner peripheral surface of the opening 51. Then, the leading end 92 comes into contact with the film 60. The user further presses in the first mounting component 40 while keeping the leading end 92 in contact with the film 60. Then, the film 60 flexes in a direction intersecting a direction in which the snap-fit portion 41 is reduced in diameter. In other words, the film 60 stretches (deforms) according to a force with which the user presses in (inserts) the first mounting component 40 (FIG. 10B). At this time, a force to return to its original shape is generated in the stretched film 60. Thus, the user may feel a repulsive force from the film 60 and find it difficult to press in the first mounting component 40. However, as described above, a material for the film 60 is a resin film having a certain strength. Accordingly, the user can further presses in the first mounting component 40 with a force which is not enough to damage the film 60.

The user then further presses in the first mounting component 40 in the insertion direction (in a Z-axis direction) until after the engaging surface 94 passes through the opening 51. After the engaging surface 94 passes through the opening 51, the elastically deformed snap-fit portion 41 returns to its original shape due to an elastic restoring force (FIG. 10C). At this time, the presence of the first column portion 52 facilitates the insertion of the slope portion 93 into a gap between the upper surface of the first mounted component 50 and the film 60. This is because in a case where there is no first column portion 52, the user cannot create the gap between the upper surface of the first mounted component 50 and the film 60 without pressing in the first mounting component 40 with a stronger force.

Further, the snap-fit portion 41 can be reliably held using the film 60 by forming the first column portion 52 having the height of the first column portion 52 lower than a height from the engaging surface 94 to the leading end 92. At this time, the film 60 contacts the slope portion 93 of the snap-fit portion 41 (in a Z-axis direction), the leading end 92, and the tip side of the back side portion 91. That is, in a case where the first mounting component 40 is mounted on the first mounted component 50, at least a portion on the tip side in the back side portion 91 of the snap-fit portion 41 (in a Z-axis direction) is held by the film 60. This suppresses elastic deformation of the back side of the snap-fit portion 41.

Conclusion

In the snap-fit structure according to the present embodiment, there is no other snap-fit portion 41 on the same line in the direction (in the X-axis direction) in which the snap-fit portion 41 elastically deforms. As a result, even in a case where it is necessary to arrange a different component on the back side of the snap-fit portion 41, the first mounting component 40 can be mounted on the first mounted component 50 in a space-saving manner. Further, in the snap-fit structure according to the present embodiment, a portion of the back side of the snap-fit portion 41 is held by the film 60. This makes it possible to suppress the disengagement of the first mounting component 40 from the first mounted component 50 due to elastic deformation (due to diameter reduction) of the snap-fit portion 41.

Third Embodiment

An object of the present embodiment is to provide a snap-fit structure in which the film 60 is less likely to peel off. A difference between the snap-fit structure according to the second embodiment and the snap-fit structure according to the present embodiment is the shape of a column portion. In the following description, the same reference numeral will be given to the same or corresponding constituent as in the second embodiment, the description thereof will be omitted, and a difference will be mainly described.

Figure 11:
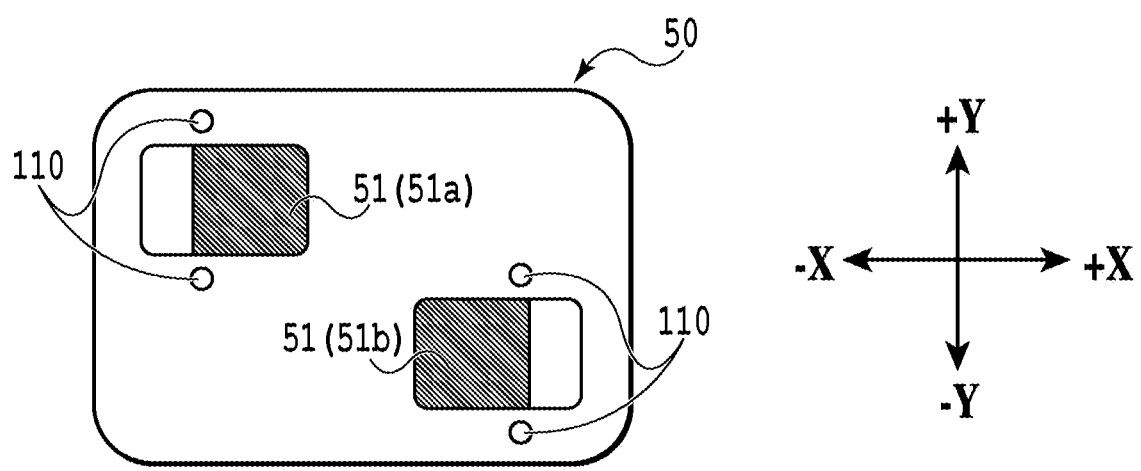
FIG. 11 is a schematic diagram of the first mounted component according to the present embodiment as viewed from above.

FIG. 11 is a schematic diagram of the first mounted component 50 according to the present embodiment as viewed from above. For convenience of description, the film 60 is not shown. As shown in FIG. 11, a second column portion 110 according to the present embodiment has a cylindrical shape smaller than the first column portion 52. It should be noted that the shape of the second column portion 110 is not limited to a cylindrical shape. As described in the second embodiment, in bonding the film 60, high molding accuracy is required so that an adhesion surface becomes flatter in order to reduce concavities and convexities on the adhesion surface. As the area of the adhesion surface is smaller as in the case of the second columnar portion 110, the area of a portion requiring high molding accuracy can be reduced.

As a result, it is possible to reduce the area of a portion where adhesion to the film 60 may be weak. Further, since the second column portion 110 is smaller than the first column portion 52, more space for arranging a different component can be made. Thus, using the second column portion 110 according to the present embodiment can provide a space-saving snap-fit structure in which the film 60 is less likely to peel off.

Fourth Embodiment

An object of the present embodiment is to provide a snap-fit structure which is formed more easily. A difference between the snap-fit structure according to the third embodiment and the snap-fit structure according to the present embodiment is that an already existing member is used instead of the column portion to adhere the film 60. In the following description, the same reference numeral will be given to the same or corresponding constituent as in the third embodiment, the description thereof will be omitted, and a difference will be mainly described.

Figure 12:
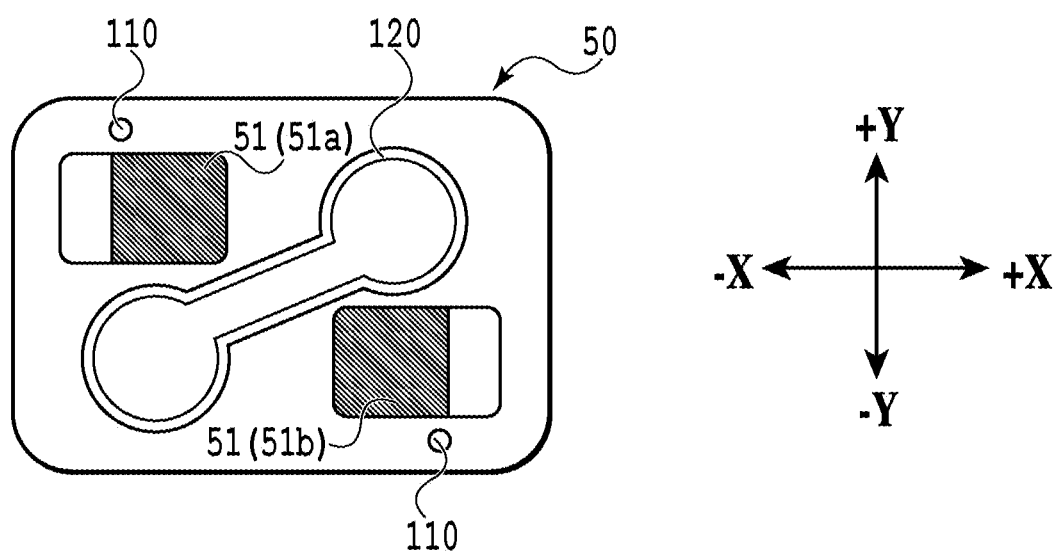
FIG. 12 is a schematic diagram of the first mounted component according to the present embodiment as viewed from above.

FIG. 12 is a schematic diagram of the first mounted component 50 according to the present embodiment as viewed from above (i.e., the +Z direction). For convenience of description, the film 60 is not shown. As shown in FIG. 12, the first mounted component 50 according to the present embodiment includes a flow path 120. The flow path 120 according to the present embodiment is surrounded by a wall whose outer periphery is higher than the surroundings by about 0.5 mm to 1.0 mm. That is, the height of the wall around the flow path 120 is approximately the same as the height of the second column portion 110.

The flow path 120 in FIG. 12 passes through from the back toward the front in the drawing. Thus, the flow path 120 is not completed at this stage. By adhering the film 60 to the upper surface of the wall around the flow path 120, the upper portion of the wall is blocked. As a result, the flow path 120 is completed.

In the present embodiment, the second column portion 110 may or may not exist. In a case where the first mounted component 50 according to the present embodiment includes the second column portion 110, the height of the second column portion 110 is preferably equal to the height of the wall around the flow path 120. This is because in a case where the height of the second column portion 110 and the height of the wall around the flow path 120 are not equal, the film 60 cannot be applied evenly and thereby may be peeled off.

Figure 13:
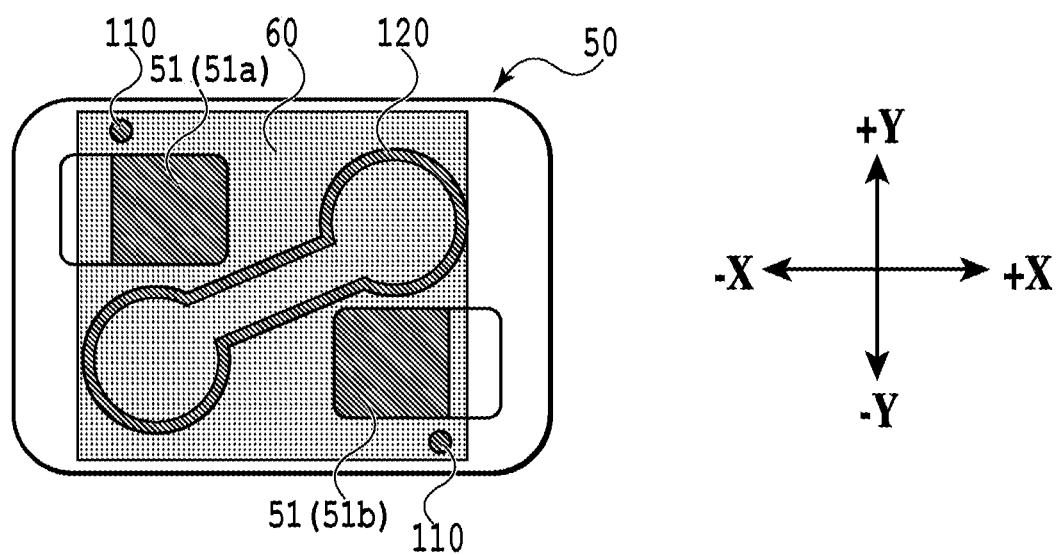
FIG. 13 is a schematic diagram of the snap-fit structure according to the present embodiment as viewed from above.

FIG. 13 is a schematic diagram of the snap-fit structure according to the present embodiment as viewed from above (i.e., the +Z direction). FIG. 13 illustrates the film 60. That is, in FIG. 13, the flow path 120 described above is completed. The flow path 120 is formed using the inner surface of the wall and the back surface of the film 60 (a surface on a depth side in the drawing) by attaching the film 60 to the upper surface of the wall around the flow path 120. It should be noted that the film 60 can be adhered to the first mounted component 50 without the wall around the flow path 120. However, the existence of the wall around the flow path 120 allows more liquid to flow by the height of the wall as compared to a case where there is no wall around the flow path 120.

As shown in FIG. 13, in the snap-fit structure according to the present embodiment, the film 60 is adhered to the upper surface of the wall around the flow path 120. As a result, even in a case where there is no second column portion 110, the film 60 can be adhered using the wall around the flow path 120 in place of a column. Accordingly, the film 60 can be adhered to the first mounted component 50 by using the already existing wall around the flow path 120 in place of a column instead of forming the second column portion 110. Consequently, since the trouble of forming the second column portion 110 can be saved, the snap-fit structure can be easily formed. The completed flow path 120 is connected to a different flow path (not shown) existing in the depth direction in the drawing.

As a result, for example, it is possible to flow liquid through a different flow path (not shown) via the flow path 120. Thus, the configuration can provide a snap-fit structure which is formed more easily.

Fifth Embodiment

An object of the present embodiment is to provide a snap-fit structure in which insertion can be performed more easily. In the present embodiment, the area of a portion for holding the snap-fit portion 41 using the film 60 is smaller than that in the fourth embodiment. In the following description, the same reference numeral will be given to the same or corresponding constituent as in the fourth embodiment, the description thereof will be omitted, and a difference will be mainly described.

Figure 14B:
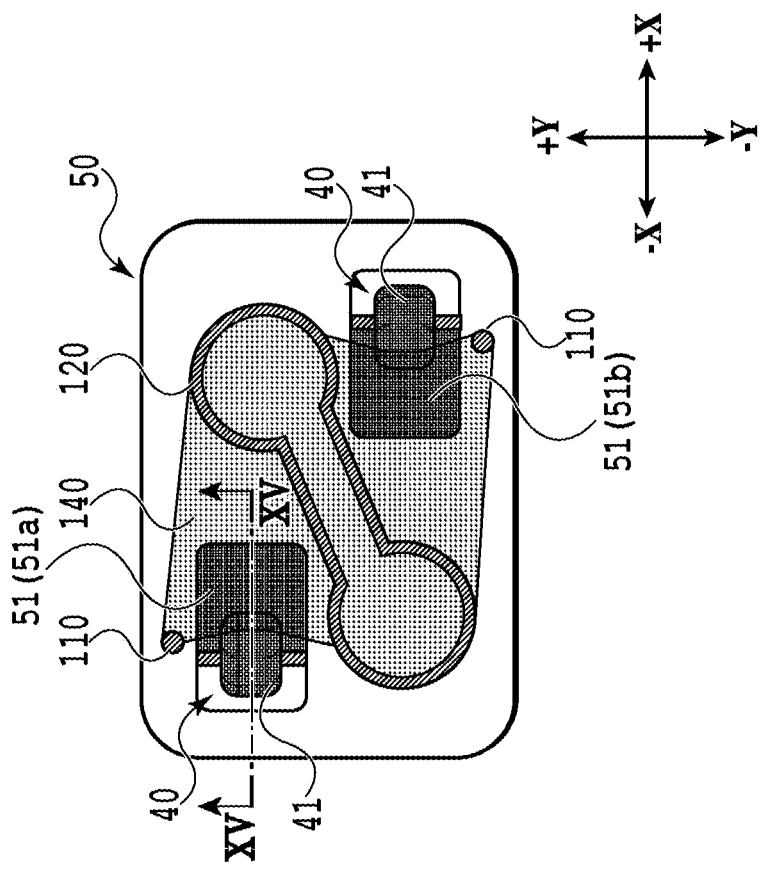
FIGS. 14A and 14B are schematic diagrams of the snap-fit structure according to the present embodiment as viewed from above.
Figure 14A:
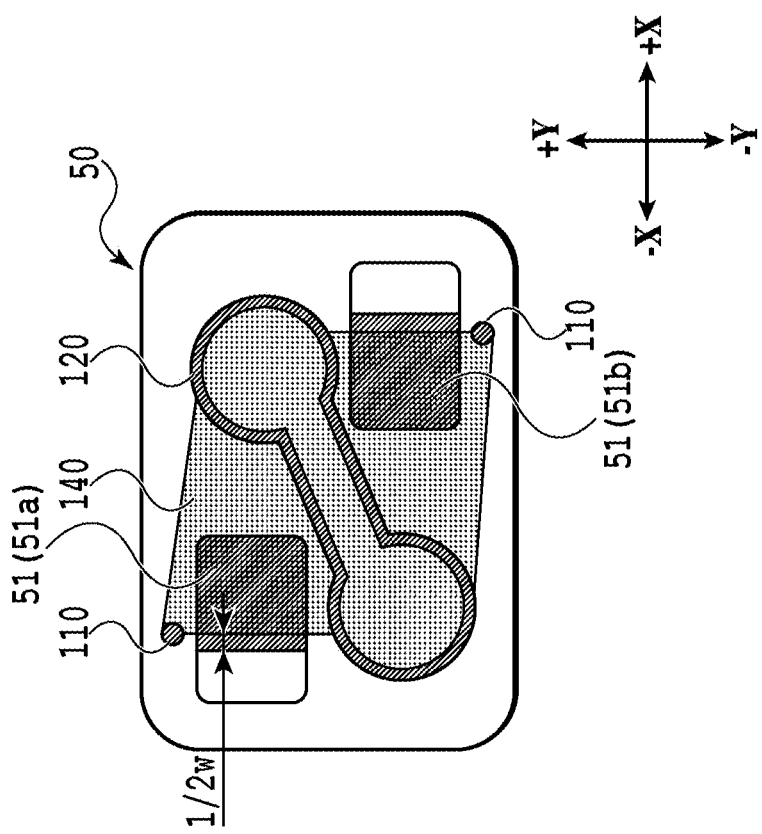

FIGS. 14A and 14B are schematic diagrams of a snap-fit structure according to the present embodiment as viewed from above. FIG. 14A is a schematic diagram showing a state before the first mounting component 40 is mounted on the first mounted component 50. As shown in FIG. 14A, the second film 140 according to the present embodiment has a smaller area than that of the fourth embodiment. The film 60 according to the fourth embodiment covers the entire upper portion of the opening 51 (see FIG. 13). On the other hand, in the second film 140 according to the present embodiment, the area of a portion covering the upper portion of the opening 51 is about half that of the fourth embodiment. Specifically, two corners of the second film 140 are adhered to the second column portion 110. Additionally, the remaining corners of the second film 140 are adhered along the top surface of the wall around the flow path 120.

FIG. 14B is a schematic diagram showing a state after the first mounting component 40 is mounted on the first mounted component 50. The film 60 according to the fourth embodiment holds the entire upper portion of the snap-fit portion 41 (see FIG. 13). On the other hand, in the second film 140 according to the present embodiment, the area (width) of a portion holding the snap-fit portion 41 is about half that of the first embodiment. That is, in the second embodiment, a portion corresponding to the entire width W (see FIG. 9) is held by the film 60. In the snap-fit portion 41 according to the present embodiment, the area (width) of a portion held by the second film 140 is ½W (see FIG. 14A).

As shown in FIGS. 14A and 14B, a surplus portion of the second film 140 is cut off. A method of cutting the second film 140 is not limited as long as the second film 140 can be cut. For example, a metal blade (such as scissors or a cutter) can be used to cut the second film 140. In the present embodiment, a laser is used to cut the second film 140. It is preferable to cut a region in the second film 140 around the second column portion 110 or the flow path 120 to which the film 60 is adhered along the shape of the second column portion 110 or the flow path 120.

In the second film 140, the region covering the upper portion of the opening 51 is preferably cut so that a portion corresponding to half (½W) of the width W of the snap-fit portion 41 can be seen. This is because the repulsive force of the second film 140 during insertion is reduced by reducing by approximately half the area of a portion for holding the snap-fit portion 41.

Schematic Diagram Showing a Method of Assembling a Snap-Fit Structure According to the Present Embodiment FIGS. 15A, 15B, and 15C are schematic diagrams showing a method of assembling the snap-fit structure according to the present embodiment.

First, in mounting the first mounting component 40 on the first mounted component 50, the user presses the first mounting component 40 in the mounting direction into the first mounted component 50 while keeping the slope portion 93 into contact with the lower end of the opening 51. Then, the snap-fit portion 41 is elastically deformed and reduced in diameter (FIG. 15A).

Next, the user further presses the first mounting component 40 in the mounting direction into the first mounted component 50 while keeping the lower end of the slope portion 93 into contact with the inner peripheral surface of the opening 51. Then, the leading end 92 comes into contact with the film 60. The user further presses in the first mounting component 40 while keeping the leading end 92 in contact with the second film 140. Then, the second film 140 stretches according to a force with which the user presses in the first mounting component 40 (FIG. 15B). At this time, a force to return to its original shape is generated in the stretched film 60. Thus, the user may feel a repulsive force from the film 60. However, in the present embodiment, the area of a portion of the second film 140 for holding the snap-fit portion 41 is about half (½W width) of that of the first embodiment (width W). Accordingly, a repulsive force from the second film 140 is weaker than in the first embodiment. Therefore, the user can easily press in the first mounting component 40.

The user then further presses the first mounting component 40 into the first mounted component 50 until after the engaging surface 94 passes through the opening 51. After the engaging surface 94 has passed through the opening 51, the elastically deformed snap-fit portion 41 returns to its original shape due to an elastic restoring force (FIG. 15C). In the present embodiment, in returning to its original shape, the snap-fit portion 41 passes through a gap between the cut second film 140 and the end portion of the opening 51 and returns to its original shape. As a result, the snap-fit portion 41 can be engaged with the opening 51.

At this time, the second film 140 contacts only the leading end 92 of the snap-fit portion 41 (in a X-axis direction) and the tip side of the back side portion 91. That is, the second film 140 does not contact a slope portion 93 side.

In the present embodiment, since the second film 140 is cut, the entire upper portion of the snap-fit portion 41 is not held. However, the second film 140 holds the snap-fit portion 41 from a portion of the leading end 92 to the tip side of the back side portion 91 (i.e., an elastically deformable side). Thus, it is possible to suppress the snap-fit portion 41 from being elastically deformed and reduced in diameter. As a result, it is possible to provide a snap-fit structure in which insertion is performed more easily and disengagement is less likely to occur.

Specific Examples

Figure 16:
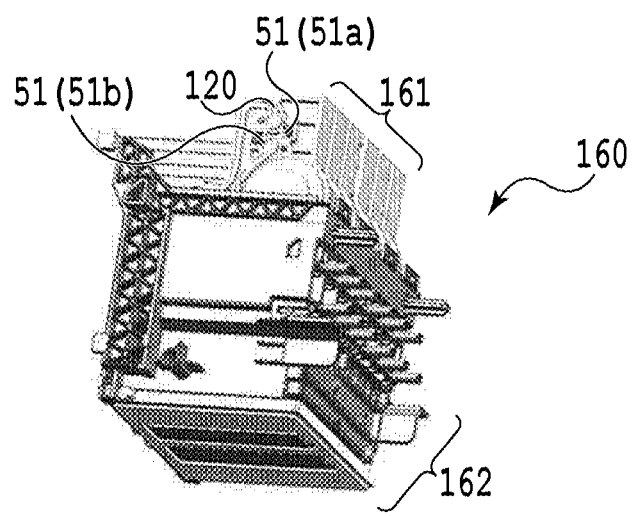
FIG. 16 is a diagram schematically showing a component using the snap-fit structure of the present disclosure.

FIG. 16 is a diagram schematically showing a component using the snap-fit structure of the present disclosure. For example, the snap-fit structure according to the fourth embodiment can be used for a print head 160 provided in a printing apparatus (e.g., a printer). As shown in FIG. 16, a main tank 162 provided in the print head 160 has a plurality of sub tanks 161 smaller than the main tank 162. For convenience of description, the film 60 is not shown. Each of the sub tanks 161 stores ink to be supplied to the main tank 162. For example, the ink inside the sub-tank 161 is supplied to the main tank 162 via the flow path 120. In the illustrated example, the snap-fit portion 41 (not shown) is inserted into the opening 51 from the back toward the front in the drawing. As a result, the first mounting component 40 can be mounted on the sub tank 161 as the first mounted component 50.

Figure 17:
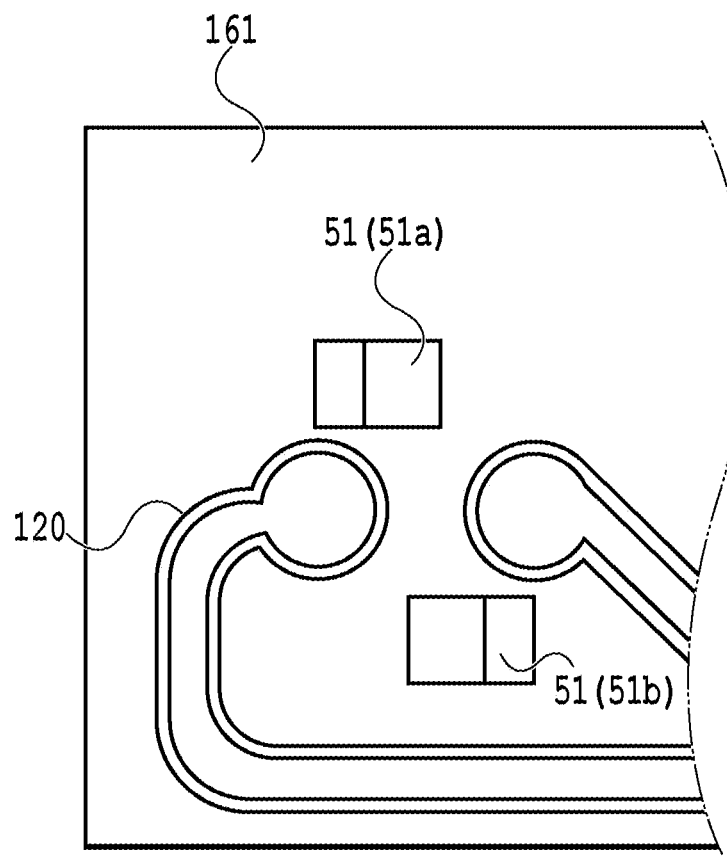
FIG. 17 is an enlarged view schematically showing the vicinity of an opening of a sub tank.

FIG. 17 is an enlarged view schematically showing the vicinity of the opening 51 provided in the sub tank 161. As shown in FIG. 17, the sub-tank 161 is formed with two openings 51 so that the two snap-fit portions 41 are not back-to-back in a case where the first mounting component 40 is attached. This is because the sub tank 161 is smaller than the main tank 162 and it is difficult to secure space for arranging a block-shaped elastic-deformation-suppressing member. Specifically, this is because the flow path 120 is formed on the back side of the second opening 51b and there is no space for arranging the elastic-deformation-suppressing member.

The illustrated print head 160 is attached to a printer (not shown). In a case where the printer performs a print operation, the print head 160 scans left and right. Thus, in a case where the print head 160 scans, there is a possibility that scanning vibration may be transmitted to the sub tank 161. Accordingly, in the sub tank 161 without the film 60, there is a case where the vibration causes the snap-fit portion 41 to deform elastically and be disengaged. However, in the illustrated sub tank 161, the film 60 can be used to wrap and hold the snap-fit portion 41, so that the elastic deformation of the snap-fit portion 41 is suppressed.

As described above, the configuration suppresses the disengagement of the first mounting component 40 from the first mounted component 50.

Other Embodiments

In the first embodiment, the first engaging portion 41a and the second engaging portion 41b are arranged so as not to be back to back. Another example is that the first engaging portion 41a may be engaged near the center of the end portion of the opening 51, the second engaging portion 41b may be engaged with a corner of the opening 51, and further the third engaging portion (not shown) may be engaged with a corner of the opening 51 which is not engaged with the second engaging portion 41b. The configuration enables space on the back side of each engaging portion to be effectively used while reducing the possibility that the first mounting component 40 may be disengaged even in a case where the first mounted component 50 is vibrated. Further, since the second engaging portion 41b and the third engaging portion are engaged with at least two corners of the opening 51, it is possible to suppress the first mounting component 40 from rotating due to vibration or the like (for example, rotating counterclockwise in the example of FIG. 5) and being disengaged from the first mounted component 50.

In the second embodiment, the first engaging portion 41a and the second engaging portion 41b are arranged so as not to be back to back. However, in the case of holding the snap-fit portion 41 with the film 60, the first engaging portion 41a and the second engaging portion 41b may be arranged back to back.

The second embodiment has shown the example in which the one film 60 is used to hold the first engaging portion 41a and the second engaging portion 41b. Another example is that the two films 60 are used, the first film 60 is used to hold the first engaging portion 41a, and the second film 60 is used to hold the second engaging portion 41b.

In the second embodiment, the first mounting component 40 is mounted on the first mounted component 50 to which the film 60 has already been attached. As another mounting method, an example is that the film 60 is attached after engaging the snap-fit portion 41 with the opening 51. However, the height of the first column portion 52 is less than the length from the engaging surface 94 to the leading end 92. In this case, accordingly, the leading end 92 is located higher than the upper surface of the first column portion 52. Thus, in a case where the user applies the film 60 after the snap-fit portion 41 is engaged with the opening 51, the film 60 must be applied so as not to make an impact on the leading end 92. That is, in a case where the film 60 is applied after the snap-fit portion 41 is engaged with the opening 51, the film 60 must be applied so as not to interfere with the leading end 92.

The second embodiment has shown the example in which the number of openings 51 is two (see FIG. 6). However, it is only required that the number of openings 51 be at least one or more and equal to or more than the number of snap-fit portions 41.

The second embodiment has shown the example in which the snap-fit portion 41 includes the first engaging portion 41a and the second engaging portion 41b (see FIG. 5). However, it is only required that the number of engaging portions having elasticity be at least one or more. For example, the first engaging portion 41a has elasticity, but the second engaging portion 42b does not have to have elasticity. In this case, the first mounting component 40 can be mounted on the first mounted component 50 by engaging the first engaging portion 41a after engaging the second engaging portion 42b.

The fifth embodiment has shown the example in which the film 60 from which the surplus portion is cut out is adhered to the second column portion 110. Another example is that instead of the film 60, a rubber plate as an elastic-deformation-suppressing member is adhered to the first mounted component 50 without the second column portion 110 interposed therebetween. In this case, the rubber plate and the first mounted component 50 may be molded as one member made of the same material (e.g., silicone rubber). Of course, as long as the rubber plate can be adhered to the first mounted component 50, a material for the first mounted component 50 may be a material other than rubber. One example is that polypropylene is used as a material for the first mounted component 50 and silicone rubber is used as a material for the rubber plate. This configuration makes it possible to use the elastic force of the rubber plate to hold a portion from a portion of the leading end 92 to the tip side of the back side portion 91 (i.e., an elastically deformed side) while reducing the repulsive force of the rubber plate at the time of inserting the snap-fit portion 41.

The technique according to the present disclosure can provide a snap-fit structure in which space on a side where a snap-fit portion elastically deforms can be effectively utilized.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-184766, filed Nov. 12, 2021, which is hereby incorporated by reference wherein in its entirety.

What is claimed is:

1. A snap-fit structure comprising:
   a mounting component with an elastically deformable first engaging portion and second engaging portion; and
   a mounted component with an engaged unit for inserting and engaging the first engaging portion and the second engaging portion,
   wherein the mounted component comprises a suppressing unit configured to suppress elastic deformation of the first engaging portion, and
   the suppressing unit contacts a leading end of the first engaging portion, the leading end being at an end of the first engaging portion where the first engaging portion is elastically deformed, wherein the suppressing unit contacts the leading end of the first engaging portion in a direction of insertion of the first engaging portion and the second engaging portion and is deformed in a direction that intersects the direction in which the first engaging portion is elastically deformed.

2. The snap-fit structure according to claim 1, wherein the second engaging portion is not arranged on an identical line in the direction in which the first engaging portion elastically deforms.

3. The snap-fit structure according to claim 1, wherein the suppressing unit has flexibility.

4. The snap-fit structure according to claim 1, wherein the suppressing unit comprises a film layer.

5. The snap-fit structure according to claim 1, wherein the suppressing unit is arranged so as to cover a first opening and a second opening formed in the engaged unit.

6. A snap-fit structure comprising:
   a mounting component with an elastically deformable first engaging portion and second engaging portion; and
   a mounted component with an engaged unit for inserting and engaging the first engaging portion and the second engaging portion,
   wherein the mounted component comprises a suppressing unit configured to suppress elastic deformation of the first engaging portion,
   the engaged unit comprises a column portion configured to protrude in a direction in which the first engaging portion and the second engaging portion are inserted,
   the suppressing unit contacts a leading end of the first engaging portion, the leading end being at an end of the first engaging portion where the first engaging portion is elastically deformed, wherein the suppressing unit contacts the leading end of the first engaging portion in the direction of insertion of the first engaging portion and the second engaging portion, and
   part of the suppressing unit contacts the column portion.

7. The snap-fit structure according to claim 6, wherein a height of the column portion in the direction in which the first engaging portion and the second engaging portion are inserted is less than a length from a lower end of a slope portion of the first engaging portion to the leading end of the first engaging portion.

8. The snap-fit structure according to claim 6, wherein the first engaging portion and the second engaging portion are arranged so as not to be aligned on an identical line in a direction of elastic deformation.

* * * * *